April 15, 1924.

F. H. SLEEPER

FRICTION CLUTCH

Filed Dec. 16, 1921

1,490,859

Inventor
Frank H. Sleeper
by attorneys
Southgate & Southgate

Witness
C. F. Nixon

Patented Apr. 15, 1924.

1,490,859

UNITED STATES PATENT OFFICE

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

FRICTION CLUTCH.

Application filed December 16, 1921. Serial No. 522,887.

*To all whom it may concern:*

Be it known that I, FRANK H. SLEEPER, a citizen of the Dominion of Canada, residing at Worcester, in the county of Worcester and State of Massachusetts, have invented a new and useful Friction Clutch, of which the following is a specification.

This invention relates to a clutch of the friction type.

The principal objects of the invention are to provide such a clutch with means that can be operated readily for frictionally connecting the parts having in itself an anti-friction device adapted to be brought into contact with the friction members so as to be easily operable and yet capable of exerting any desired amount of pressure on the friction transmitting surfaces; to provide this anti-friction device in the form of freely rotating elements coming in contact with each other; and to provide a simple means for adjusting the clutch and locking the adjustment when made in an absolutely certain but very simple way and by the use of a minimum number of mechanical elements.

The invention also involves improvements in the details of construction by which these results are secured.

Reference is to be had to the accompanying drawings, in which—

Figure 1:
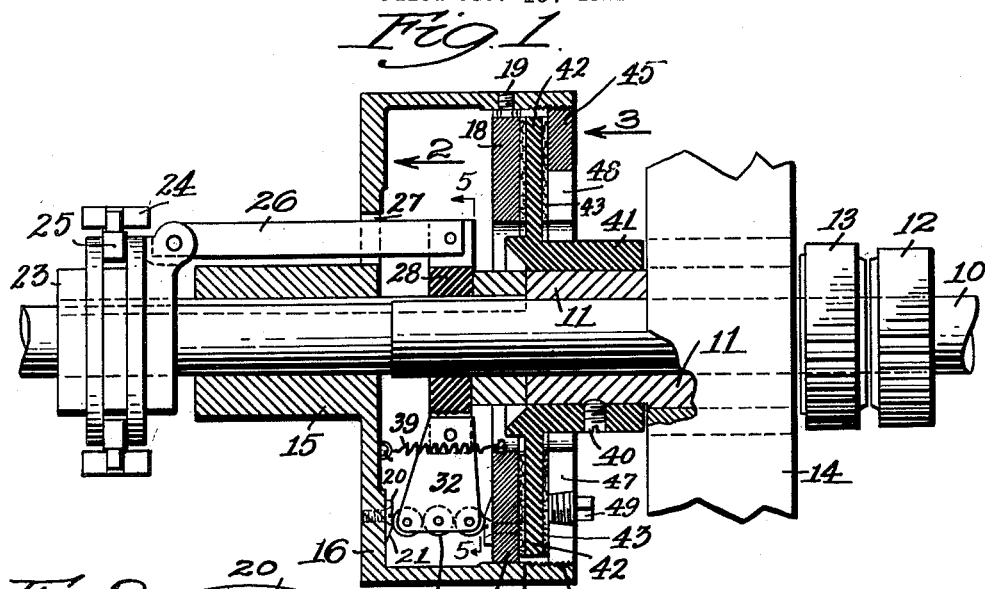
Fig. 1 is a longitudinal central sectional view of a clutch constructed in accordance with this invention showing it in clutching position.
Figures 2, 3:
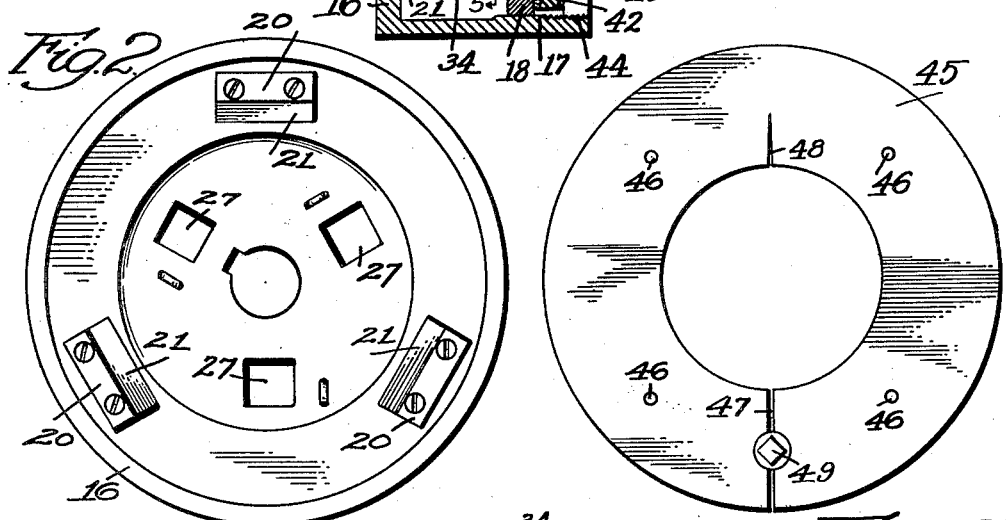
Fig. 2 is an inside view of one member of the clutch looking in the direction of the arrow 2 in Fig. 1.
Fig. 3 is an end elevation of the locking ring.

I have shown the invention as applied to an inner shaft 10 and an outer hollow shaft 11, one centered inside the other and each having a gear, 12 and 13 respectively, thereon to transmit power. In this case power can be transmitted from either one to the other with this clutch. I have shown the outer or hollow shaft 11 as supported in a bearing on a frame 14 but no other mechanism is illustrated for being driven through this clutch as it is not intended to be limited to any particular line.

Keyed on the shaft 10 is a hub 15 preferably integral with one clutch member 16. This clutch member is shown in the form of a cup-shaped construction and is provided with a cylindrical surface 17 inside along which is adapted to move axially the other clutch member 18. This clutch member is shown in the form of a circular disc provided with a key-way or slot into which the head of a screw 19 extends to cause the disc 18 to rotate with the member 16 although capable of moving axially therein. The head of the screw is flattened and it is larger than the screw threaded hole through the cylindrical wall of the clutch member 16. The screw is inserted from within and cannot come out unless the member 18 is withdrawn.

On the flat faces of the two members 16 and 18 there are two series of pressure transmitting plates 20. In this case, I have shown three pairs of these plates. Each one has a slanting surface 21, which slanting surfaces are arranged oppositely. One slanting surface is shown on the outer edge of each of one series of plates, the corresponding slanting surface being on the inner edge of the other series. These plates are, of course, positively fixed to the respective clutch members 16 and 18. It may be stated at this time that I provide means for exerting pressure on these inclined surfaces and eventually, if necessary, on the flat surfaces to force the two members 16 and 18 apart. This effects the relative sliding motion of the member 18 in the cup-shaped member 16.

Figures 4, 5:
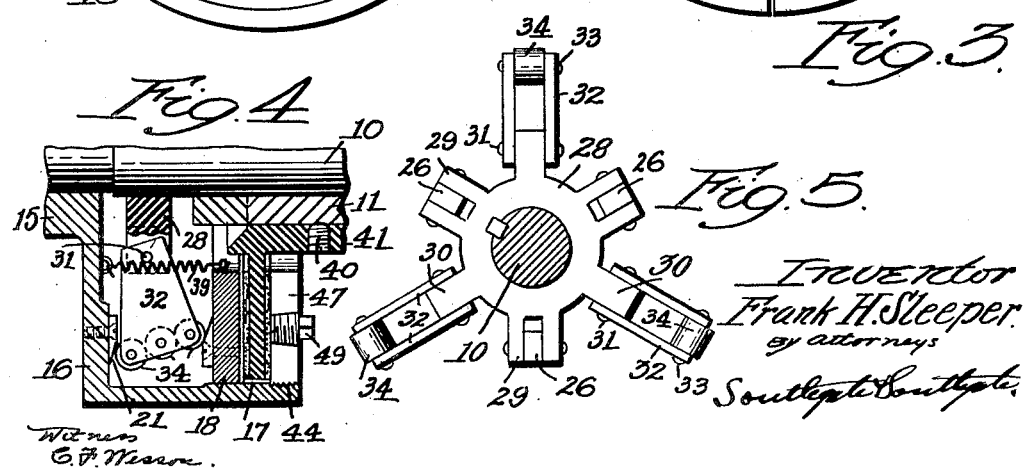
Fig. 4 is a sectional view similar to part of Fig. 1 showing the parts in released position.
Fig. 5 is a sectional view on the line 5—5 of Fig. 1.

For the purpose of accomplishing the last named object, the shaft 10 is provided with a clutch collar 23 having the usual groove in its circumference and adapted to be reciprocated by a lever or the like having a yoke 24 provided with projections 25 extending into the groove. I have shown this collar as provided with three links 26 pivoted to it and extending parallel to the shaft and through a corresponding number of openings 27 in the member 16. These links are pivoted to a slide 28 on the shaft by means of pins extending through pairs of lugs 29 equally spaced around it. The slide or collar 28 is slidably keyed on the shaft. It also has another series of lugs 30, three in number in the present instance, at the ends of which are pivot pins 31 for pivotally connecting with these lugs a series of three frames 32, each frame comprising a pair of plates. Each of these frames is shown as provided with studs 33, each having a roller 34 thereon. These rollers, three in number, in each case as illustrated, bear on each other and the two end ones project beyond the frames 32 at the opposite sides so as to be adapted to come into engagement with the opposite plates 20. When the collar 23 is drawn to the left as shown in Fig. 5 the collar 28 also, of course, is drawn to the left and the several studs 31 are moved the same distance to the left. Therefore, in that position the three rolls 34 of each frame are in the position shown in Fig. 4. That is, the two end rolls of each set rest on the inclined surfaces 21 and they do not force the ring 18 outwardly, so no power is transmitted. Three springs 39 are shown tending always to restore the clutch to this position. When the collar is moved over to the position shown in Fig. 1 the device is straightened out, so to speak, and the rolls are brought into the position shown in that figure where they engage the highest parts of the surfaces 20 and force the ring 18 to the right along the shaft.

The shaft 11 has fixed to it, by set screws 40 or the like, a hub 41 which has a disc 42 preferably integrally mounted on it. On both sides of this disc there are circular friction discs 43 formed of any of the usual materials employed in friction clutches to frictionally transmit power from the member 18 to the disc 42, and thus rotate one shaft from the other.

I also provide means for adjusting the clutch to take up wear or for any of the usual purposes. For this purpose I have shown a disc 45 constituting a cover for the open end of the clutch. This disc has a screw thread on its edge and the member 16 has a screw thread at 44 receiving and fitting it. In order to adjust the friction, this disc is turned in or out as may be desired. It is shown as provided with four perforations 46 for receiving a spanner for turning it. In order to lock this disc in adjusted position it is provided with a slit 47 from one edge extending through to the open center and this slit preferably extends at 48 into the other side of the disc. Centrally located with respect to this slit is a conical screw threaded opening in which a screw plug 49 is inserted. This is screwed up tight to spread the disc and hold it firmly in adjusted position.

The operation of the device has been fully explained in connection with the description of the elements.

It will be seen that this constitutes a safe and practical construction in which an anti-friction device is employed for exerting the pressure to create the friction necessary to transmit the power from one shaft to the other and just as soon as this is turned far enough to relieve the pressure the device will cease to act to transmit power. The construction is such that all the parts are enclosed within a casing comprising one of the friction members and the adjusting cover. This adjusting cover also is an important element of the invention as it not only acts as a cover to close the device and keep foreign substances out but it also effectively locks the device in its adjusted position and the delicacy of adjustment is very great on account of having the screw threaded connecting surface at such a distance from the center.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described but what I do claim is:—

1. The combination with a pair of shafts and a friction clutch therefor having friction surfaces, of means for operating said friction surfaces to force them together comprising a longitudinally movable slide having arms radiating therefrom and spaced equally around the slide, a frame pivotally mounted on each of said arms, a series of rolls freely rotatable on each of said frames at the end thereof, said rolls of each series being mounted in contact with each other, a pair of members rotatable with one of the shafts having a space between them in which said frames are located and provided with opposite surfaces in planes perpendicular to the axis of the shaft for receiving the pressure of said rolls, said surfaces having opposite inclined portions extending away from each other in opposite directions for receiving the rolls when the clutch is released.

2. In a friction clutch, the combination with two relatively rotatable shafts, a disc connected with one of said shafts, a member mounted to rotate with the other shaft comprising two discs between which the first named disc is located, one of said two discs being fixed in stationary position on the rotatable member and the other being movable longitudinally, and friction members between the first named disc and the other two discs, of means for moving the movable disc comprising a longitudinally movable slide, a set of frames radiating from said slide a row of parallel studs across the end of each frame, and a roll centered on each stud, each mounted to rotate freely and arranged in alignment across the end of the frame in contact with each other, the end rolls being adapted to contact respectively with the movable disc and with a surface on said member.

In testimony wherof I have hereunto affixed my signature.

FRANK H. SLEEPER.